United States Patent [19]

Normann et al.

[11] 4,378,823
[45] Apr. 5, 1983

[54] METHOD AND APPARATUS FOR UNTWISTING AND CUTTING TWISTED CABLE

[75] Inventors: Richard W. Normann, Otego; Paul D. Niles, Bainbridge, both of N.Y.

[73] Assignee: The Bendix Corporation, Southfield, Mich.

[21] Appl. No.: 137,167

[22] Filed: Apr. 4, 1980

[51] Int. Cl.³ .............................................. B21F 1/02
[52] U.S. Cl. .................................... 140/139; 83/200; 140/147
[58] Field of Search .......................... 140/2, 139, 147; 57/1 UN, 2.3; 83/196, 198, 199, 200

[56] References Cited

U.S. PATENT DOCUMENTS

| | | | |
|---|---|---|---|
| 472,210 | 4/1892 | Flinn | 83/198 |
| 1,831,447 | 11/1931 | Heinrich | 83/200 |
| 2,288,385 | 6/1942 | Beard | 83/200 |
| 2,391,061 | 12/1945 | Mackintosh | 83/198 |
| 3,725,844 | 4/1973 | McKeown et al. | 339/49 R |
| 3,891,013 | 6/1975 | Folk et al. | 140/147 |
| 4,132,251 | 1/1979 | Folk et al. | 140/147 |
| 4,132,252 | 1/1979 | Shatto, Jr. | 140/147 |

Primary Examiner—John McQuade
Attorney, Agent, or Firm—Charles D. Lacina; Raymond J. Eifler

[57] ABSTRACT

An apparatus (10) is provided which both untwists and shears a forward end of twisted conductive strands of a multi-stranded wire (40). A pair of strand receiving members (20, 30) having acutely angled front surfaces (24, 34) are slidably disposed and in spaced relationship by a support (12). To untwist the strands the twisted strands are inserted into and passed through a wire passage (26) and into guide bores (27) of the first strand receiving member (20). To shear the strands, the strands are then passed from the first strand receiving member (20) and into guide bores (37) of the second strand receiving member (30). Strand receiver (30) is then displaced with respect to strand receiver (20) with the strands extending between the front surfaces being sheared apart and provided with an acutely angled end defining an elliptical surface. The strand shearing is preferably across the minor axis of the ellipse.

25 Claims, 7 Drawing Figures

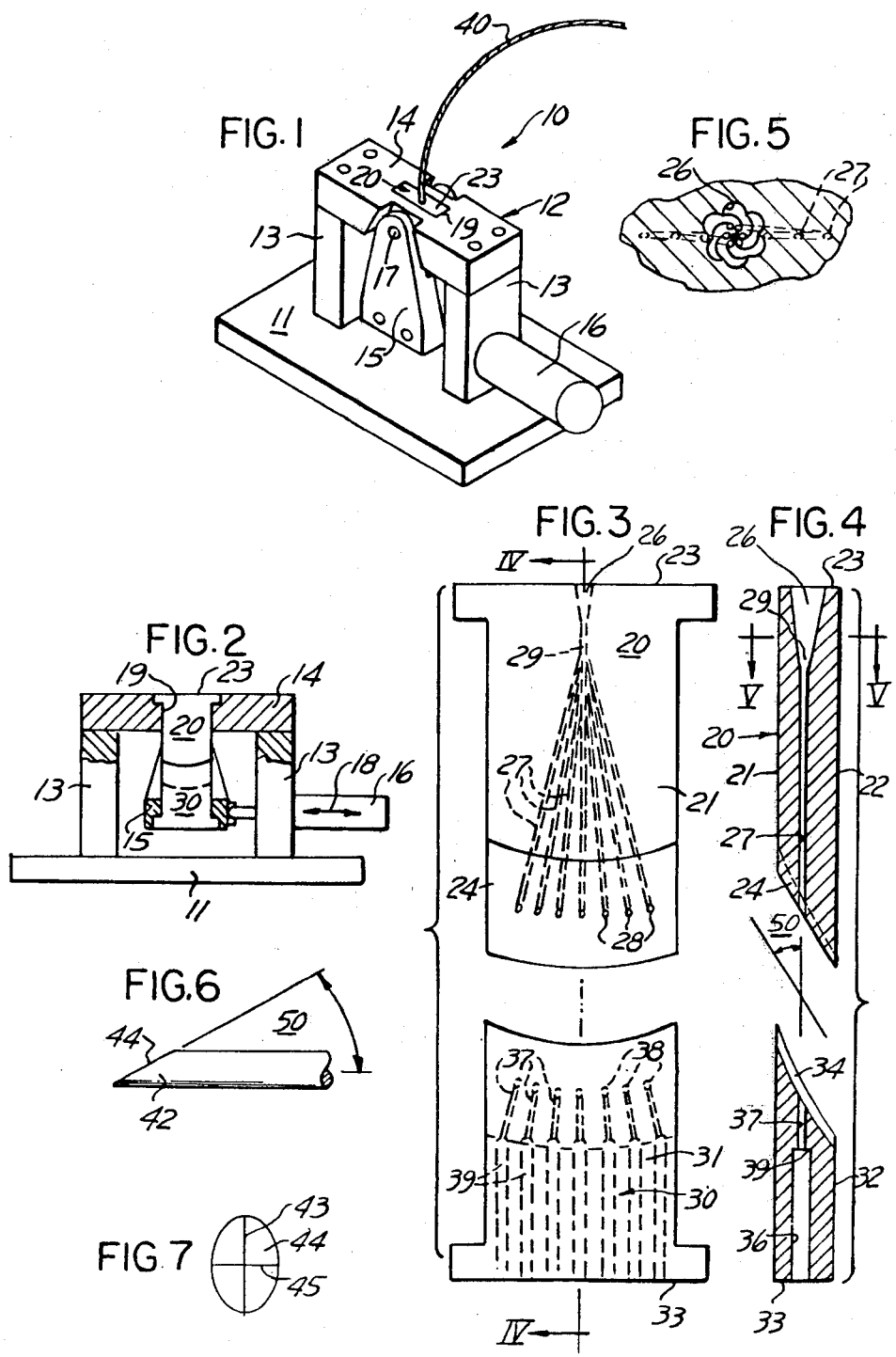

METHOD AND APPARATUS FOR UNTWISTING AND CUTTING TWISTED CABLE

TECHNICAL FIELD

This invention relates to a mechanism for preparing the end of an electrical wire and more particularly to a method and apparatus for untwisting and simultaneously cutting twisted conductive ends of an electrical wire.

BACKGROUND OF THE INVENTION

For providing an electrical interconnection, many electrical contacts having a mateable end and an end terminated to a stripped portion of a conductor wire are known in the prior art. One such contact is shown in U.S. Pat. No. 3,725,844 and entitled "Hermaphroditic Electrical Contract". In this contact, the mateable end comprises a plurality of several fine wires bundled into a brush. Such electrical contacts have a disadvantage that they require separate manufacture of and separate installation of a conductive portion that must be terminated to each electrical conductor wire. Such separate manufacture and installation is undesirable in many instances. It would be desirable to eliminate or at least reduce the number of necessary components.

It has been proposed that termination to a conductor wire be eliminated and, that with suitable preparation of a multi-stranded electrical conductor cable, that the conductor cable itself can be an integral portion of the electrical contact. Such systems are proposed in U.S. Pat. No. 4,206,958, entitled "Electrical Conductor Having An Integral Electrical Contact," issuing June 10, 1980 and in concurrently filed Ser. No. 137,228 entitled "Electrical Connector Assembly". The former system has an undesirable feature in that an additional part is necessary which must be manufactured and assembled to the conductor before the conductor can be its own contact. Since the manufacture and assembly of parts is costly in time and labor, such a system involves additional expenditure. Further, the former system presupposes that the conductor will be of a fixed size to be secured within the passage. This is not always the case and might present a problem. It would be desirable to utilize a multi-stranded conductor wire, such as disclosed by the latter system, which alone provides a contactless connector. The latter system requires that exposed end strands of a twisted multi-stranded cable be both untwisted and sheared.

In the past, various devices have been suggested for deploying and/or untwisting strands twisted wire such as typified by the U.S. Pat. Nos. 4,132,251, "Apparatus for Deploying Twisted Wires," and 4,132,252, "Method and Apparatus for Deploying Wires," each issuing Jan. 2, 1979. Such apparatus requires an open grooved surface to receive the strands and a roller to compress the wire strand bundle downwardly and into the grooves. However, these devices have a disadvantage that the user cannot always be assured that one wire will seat within one groove, thereby creating uncertainty that each wire will be cut in a separate channel. It would be desirable to provide an apparatus which would both untwist and cut the ends from a multi-stranded cable.

Accordingly, the contacts and wire preparation apparatus known in the prior art, have limitations and disadvantages.

DISCLOSURE OF THE INVENTION

The present invention overcomes the limitations and disadvantages of the prior art methods and apparatus for shearing the ends of conductive strands of multi-stranded electrical cable by providing a simple apparatus which is easy to manufacture and which provides a quality method for untwisting and shearing conductive strands.

Accordingly, the present invention is characterized by an apparatus 10 for untwisting and shearing an exposed length of twisted conductive strands and comprising first and second strand receiver plates 20, 30 having respectively front 24, 34 and rear surfaces 23, 33 and guide bores 27, 37 for receiving the strands, each guide bore having an opening 28, 38 on the respective front surface, a frame 12 for positioning the front surfaces and aligning the openings of the strand receiver plates in spaced facing relationship, the first strand receiver plate 20 being rigidly mounted to the frame and the second strand receiver plate 30 being slidably mounted in the frame and means for transversely displacing the second receiver plate 30 relative to the first receiver plate 20. The first strand receiver plate 20 includes a wire passage 26 (or header) for receiving the exposed bundle of twisted conductive strands and communicating with the plurality of strand guide bores 27 for receiving the individual wire strands, the passage 26 extending from the rear surface 23 to an interior location 29 of the plate. The second plurality of guide bores 37 extend from the front surface 34 and to the rear surface 33. When the guide bore openings 28, 38 are aligned, the strands may pass between the plates 20 and 30.

Wire strands passed from the passage 26 into the guide bores 27 of the first strand receiver plate 20 are thereby untwisted. Wire strands passed between the strand receiver plates are sheared when the second strand receiver 30 is displaced transversely of the first strand receiver 20. The front surfaces 24, 34 of the strand receiving members are acutely angled so that each strand is provided with an acutely angled ends.

Other objects and advantages of the present invention will be apparent to one skilled in the art in view of the following detailed description of the invention and the claims and the accompanying drawings.

BRIEF DESCRIPTION OF THE DRAWINGS

FIG. 1 is a perspective view of an apparatus according to the present invention shown receiving a multi-stranded electrical cable.

FIG. 2 is a side view of the apparatus of FIG. 1, taken partly in section, showing a pair of strand receiving plates.

FIG. 3 is an enlarged side view of the strand receiving plates shown in FIG. 2.

FIG. 4 is a side view of the plates sectioned along lines IV—IV of FIG. 3.

FIG. 5 is a view showing a twisted strand receiving passage of one strand receiver plate taken along lines V—V of FIG. 4.

FIG. 6 is a side view of a conductive strand sheared by the apparatus of FIG. 1.

FIG. 7 is a view of the surface formed on the front end of the strand end of FIG. 6.

DETAILED DESCRIPTION OF THE INVENTION

FIG. 1 shows an apparatus 10 for untwisting and cutting a length of twisted conductive strands (not shown) of a multi-stranded wire 40. Apparatus 10 positions a first strand receiving plate 20 adjacent to a second strand receiving plate 30. The plurality of twisted conductive strands of the electrical cable 40 are received for untwisting by the first strand receiving plate 20. According to the present invention, the apparatus 10 includes a base 11, a U-shaped frame 12 extending upwardly from the base, a plate block 15 rotatably supported by a pin 17 to the frame 12 for positioning the second strand receiving plate 30 adjacent and spaced from the first strand receiving plate 20 and means for sliding or displacing the first strand receiving plate 20 relative to the second strand receiving plate 30.

The frame 12 includes a pair of spaced uprights 13 and a support block 14 extending between the uprights for supporting the plate block 15. The means for sliding or transversely displacing the strand receiving plates is shown as an actuator comprising a plunger 16 mounted to the frame.

FIG. 2 shows a side view of the apparatus 10 taken partly in section and without the cable 40. The first strand receiving plate 20 is rigidly mounted to or held in a recess 19 of the support block 14 with the second strand receiving plate 30 being positioned adjacent the first strand receiving plate 20 by the plate block 15. The plunger 16 displaces the second plate in the direction of the arrow 18 and displaces the second plate from a first to a second position.

FIGS. 3 and 4 show the first strand receiver plate 20 separated (for clarity) from the second strand receiver plate 30. The first plate 20 includes generally parallel and planar top and bottom surfaces 21, 22, oppositely disposed front 24 and rear faces 23 respectively for dispensing and receiving strands of the cable, the front face 24 defining an acutely angled surface. A wire receiving passage 26 extends from the rear face 23 of the plate 20 forwardly to an interior location 29 and serves on a header for receiving the bundle of twisted strand ends of the electrical cable. A plurality of guide bores 27 extend radially outwardly from the intermediate location 29 to openings 28 on the front face 24. Each of the guide bores are sized to permit a single strand to pass therethrough.

The second strand receiver plate 30 is defined by generally parallel and planar top and bottom surfaces 31, 32 and includes oppositely disposed front and rear faces, 34, 33 respectively for receiving and dispensing single strands of the cable, the front receiving face 34 defining an acutely angled surface. A plurality of guide bores 37 extend from their opening 38 on the front receiving face 34 to an interior location 39 whereat enlarged discharge bores 36 extend to the other face 33.

As shown in FIG. 4, front faces 24 and 34 are acutely angled as indicated by number 50 relative to the guide bores 27, 37 with a portion of the guide bores of one plate being adapted to be brought into confronting and axially aligned relation with a portion of the guide bores of the other plate. The front surfaces of the plates are generally arcuate with the front surface of the first and second plates being respectively generally convex and concave. The distance of each bore 27, measured between the interior location 29 and front surface opening 28 is substantially the same. The openings 28 on the front surface 24 are transversely disposed in one plane so that each strand, when cut, will be of equal length.

Shown best in FIGS. 3 and 4, the guide bores 27, 37 having openings 28, 38 are radially aligned and the guide bores have their axes disposed in a plane which lies between and parallel to the top and bottom surfaces of each of the respective plates 20, 30.

FIG. 5 shows a sectioned portion of the of the first strand receiver plate 20 with the strand entry wire passage 26 and the plurality of strand guide bores 27 radiating from the passage.

FIG. 6 shows a circular conductive strand 41 having an end 42 provided with an end having a surface at an acute angle 50 relative to the primary axis of the strand, an imaginary plane passing through the strand at the acute angle 50 describing an elliptical surface 44 on the strand end. The ellipse is described by a major axis 43 and a minor axis 45. (See FIG. 7). Preferably and in accord with the invention, the strands are cut transversely of the strand primary axis and in the direction defining the minor axis of the ellipse so formed. Cutting across the strand and in a direction of the major axis tends to form burrs. However, it has been found that a cut across the minor axis provides a strand end that is substantially burr-free.

If desired, the strand ends need not be equal lengthed. The front surface angle need not be acutely angled and the guide bores need not be disposed in the same relative plane. The guide bores 27 may radiate out conically from its apex at location 29 and define a circularly shaped pattern of openings on front surface 24.

OPERATION

A multi-stranded electrical cable 40 having a plurality of round, helically twisted conductive strands and enclosed by an outer insulation jacket of generally circular outer cross-section is provided. By methods known in the art, the forward end portion of the cable insulation is removed to expose the conductive strand ends. The exposed strands 41 are inserted into the wire passage 26 (or header) disposed on the rear face 23 of the first plate 20 and pressed inwardly of the passage until the exposed ends reach the interior location 29 marking the beginning of the guide bores 27. The strands are progressively forcibly urged into the passage whereby each strand end is forced into a guide bore, thereby untwisting the strands. The untwisted strands are pressed through the openings 28 on the the front surface 24 on first plate 20 and into the aligned openings 38 of the guide bores 37 in the second plate 30. The actuation means are then actuated, causing the second strand receiving plate 30 to rotate from a first and aligned position and to a second and non-aligned position, a rotation sufficient that the guide bores 37 of the second plate 30 do not match with the guide bores 27 on the first plate 20, thereby shearing the strands along a surface defined by the acutely angled front surfaces 24, 34 of the plates 20, 30. The sheared off end portions then fall downwardly and through the discharge bores 36.

Having thus described the invention, what is claimed is:

1. An apparatus for untwisting and shearing a length of twisted conductive strands, the apparatus comprising:

first and second strand receivers having front and rear surfaces and guide bores for receiving the strands, each of the guide bores being sized to receive one conductive strand and having an opening on the front surface of its respective strand receiver with the guide bores in said first strand receiver converging from their openings to a common point sized to receive the twisted conductive strands and the guide bores in said second strand receiver diverging from their openings, said bores and openings being in alignment when the strand receivers are located in a first position;

means for locating the front surfaces of said strand receivers in spaced facing relationship and disposing the bores in their first position; and means for displacing one strand receiver with respect to the other strand receiver so as to displace the bore openings from their first position to a second position where the bore openings are nonaligned, said twisted conductive strands being constrained into said bores upon being urged against said common point, untwisted when passed through the bores radiating outwardly therefrom and into the bores in the other receiver and sheared when the receivers are moved.

2. An apparatus as recited in claims 1 wherein said locating means includes means for fixedly mounting said first strand receiver and means for movably mounting said second strand receiver.

3. An apparatus as recited in claim 2 wherein said displacing means includes a plunger mounted to said second strand receiver, said plunger being adapted to move in a direction generally transversely of the guide bores.

4. An apparatus as recited in claim 2 wherein said locating means comprises:

a base;

a U-shaped frame extending from the base and including a pair of spaced uprights and a support block extending between the uprights, said support block being adapted to fixedly receive the first strand receiver; and a plate block extending from and movably mounted to the support block, the plate block being adapted to receive the second strand receiver.

5. An apparatus as recited in claim 2 wherein said front surfaces are acutely angled.

6. An apparatus as recited in claim 5 wherein a leading edge of the first strand receiver is convex and a leading edge of the second strand receiver is concave.

7. An apparatus as recited in claim 6 wherein said first strand receiver is stationary and receives the twisted conductive strands and said displacing means rotates the front surface of the second strand receiver in displacing the openings from the aligned to the nonaligned positions.

8. A method of untwisting a plurality of twisted conductive strands and cutting the untwisted strands, the strands being enclosed by a jacket of insulation of a multi-stranded conductor cable having a generally circular outer cross section, the method comprising the steps of:

removing a forward portion of the insulation to expose a forward end of the twisted conductive strands;

providing first and second strand receiving members of the type having at least one confrontable surface, the first strand receiving member being provided with a wire passage sized to receive the exposed forward end of the twisted strands and a plurality of strand guide bores sized to receive one wire strand, the wire passage extending inwardly from one end thereof and the plurality of guide bores extending inwardly from the confrontable surface and interconnecting with the wire passage and the second strand receiving member having a like plurality of strand guide bores extending inwardly from its confrontable surface and therethrough to another end thereof, the guide bores of each strand receiving member being adapted to be in alignment when the members are in a first position and out of alignment when the members are in a second position;

positioning the confrontable surfaces of the strand receiving members in the first position so that the guide bores are aligned;

inserting the forward end of the twisted strands into the wire passage of the first strand receiving member;

progressively pushing the forward end into the wire passage whereby the strands are directed to the guide bores of the first strand receiving member;

forcibly urging the strands into, through and outwardly of the guide bores in the first strand receiving member and into the guide bores of the second strand receiving member, thereby untwisting the conductive strands;

moving the second strand receiving member relative to the first strand receiving member from the first position and into the second position to displace the confrontable surfaces, the displacement thereby shearing the strand portion disposed in the second member from the cable and strands disposed in the first member; and removing the cable having untwisted and sheared strand ends from the first strand receiving member.

9. A method as recited in claim 8 wherein the positioning step comprises the steps of:

providing a support frame, and mounting the strand receiving members to the support frame, and wherein the step of providing strand receivers comprises the steps of:

acutely angling the confrontable surfaces of said strand receiving members as defined by a plane disposed at an acute angle relative to the longitudinal axis of the wire guide bores, the acutely angled plane passing through the longitudinal axis of each strand describing on each strand an elliptical surface defined by major and minor axes.

10. A method as recited in claim 9 wherein the step of moving the second strand receiving member relative to the first strand receiving member includes sliding the confrontable surfaces in a direction defined by the minor axis of the elliptical surface.

11. A method as recited in claim 9 wherein the strand guide bores extending between the wire passage and the confrontable surface in the first strand receiving member lie in one plane and are of equal length, wherein the confrontable surfaces of the first and second strand receiving members respectively are convex and concave and wherein the step of moving includes rotatably sliding the confrontable surface of one member relative to the other.

12. For use with an electrical wire of the type having a forward end portion of insulation removed to expose a plurality of twisted conductive strands, an apparatus for untwisting and cutting the exposed forward ends of the conductive strands, the apparatus comprising:

a frame;

first and second wire receiver members supported by the frame, each of said wire receiver members having front and rear faces and mounted to the frame with the front faces being disposed in facing relationship;

said first wire receiver member comprising:

a wire receiving passage extending from the rear face forwardly and sized to receive the twisted forward end of the conductive strands; and a plurality of first strand guide bores extending from the front face rearwardly and sized to receive one of the conductive strands, each of said guide bores intercepting the wire receiving passage at a location between the faces, said second wire receiving member comprising:

a like plurality of second strand guide bores extending between the front and the rear faces; and means operatively coupled to said members for displacing the front faces from a first position and into a second position, each of the first and second strand guide bores being in alignment in the first position and out of alignment in the displaced second position, the displacement being at least as great as the conductive strand diameter.

13. An apparatus as recited in claim 12 wherein the front faces of the first and second wire receiving members are acutely angled.

14. An apparatus as recited in claim 12 wherein a leading edge of the front surface of the first member is generally convex and the front surface of the second member is generally concave.

15. An apparatus as recited in claim 14 wherein the means operatively coupled to said receiver members is adapted to rotate the front face of the second wire receiver member about the front face of the first wire receiver member.

16. An apparatus as recited in claim 13 wherein the length of each strand guide bore in the first wire receiver is the same.

17. An apparatus as recited in claim 13 wherein each of the strand guide bores are disposed in one plane.

18. An apparatus as recited in claim 17 wherein each of the wire receiver members are generally plate like and characterized by parallel top and bottom surfaces and with the strand guide bore plane being intermediate and parallel to the top and bottom surfaces.

19. An apparatus as recited in claim 13 wherein a portion of the strand guide bores of the first wire receiver member is axially aligned with a portion of the strand guide bores of the second wire receiver member when the front surfaces are aligned and disposed in the first position.

20. An apparatus as recited in claim 19 wherein the strand guide bores of the second wire receiver includes a second portion, the second portion having a substantially larger diameter.

21. An apparatus for untwisting twisted conductive strands of a multi-stranded electrical cable and for shearing the untwisted ends, the apparatus comprising:

a first plate having top and bottom surfaces, a wire passage sized to receive the twisted conductive strands and a plurality of guide bores sized to receive one untwisted conductive strand, the wire passage extending from a rear surface to an interior location and the guide bores radiating from the interior location and outwardly to the front surface;

a second plate having top and bottom surfaces, and a like plurality of guide bores extending between front and rear surfaces, the front surfaces being complementary and the guide bores in the second plate being aligned with the guide bores in the first plate in at least one position;

a frame for fixed mounting the first plate relative to the second plate;

said second plate being mounted in the frame for sliding movement relative to the first plate to sever at least one length of wire extending through the first plate to form a plurality of wire terminals; and means to slide the second plate relative to the first plate from first to second positions, whereby the strand is sheared.

22. An apparatus as recited in claim 21 wherein the front surface of the first plate and the front surface of the second plate are acutely angled.

23. An apparatus as recited in claim 22 wherein the guide bores of each plate intersect the front surface and lie in a common plane.

24. An apparatus as recited in claim 21 wherein the first plate front surface is convex and the second plate front surface is concave.

25. An apparatus as recited in claim 21 wherein the ends of each strand are sheared so as to form an elliptical surface on the strand end, the minor axis of the ellipse controlling the direction of the cut.

* * * * *